(12) United States Patent
Ito et al.

(10) Patent No.: US 11,975,715 B2
(45) Date of Patent: May 7, 2024

(54) DRIVING ASSISTANCE APPARATUS

(71) Applicant: TOYOTA JIDOSHA KABUSHIKI KAISHA, Toyota (JP)

(72) Inventors: Shogo Ito, Shizuoka-ken (JP); Kohei Tochigi, Shizuoka-ken (JP); Kumiko Kondo, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 17/527,574

(22) Filed: Nov. 16, 2021

(65) Prior Publication Data
US 2022/0153267 A1     May 19, 2022

(30) Foreign Application Priority Data
Nov. 18, 2020    (JP) .................................. 2020-191425

(51) Int. Cl.
*B60W 30/14*     (2006.01)
*B60W 40/02*     (2006.01)
(Continued)

(52) U.S. Cl.
CPC .......... *B60W 30/146* (2013.01); *B60W 40/02* (2013.01); *B60W 40/105* (2013.01);
(Continued)

(58) Field of Classification Search
CPC .. B60W 30/146; B60W 40/02; B60W 40/105; B60W 2540/10; B60W 2552/30;
(Continued)

(56) References Cited

U.S. PATENT DOCUMENTS 6,076,034 A * 6/2000 Satoh ................. B60K 31/0058
    701/431
6,268,804 B1 * 7/2001 Janky ...................... G01S 19/48
    340/904
(Continued)

FOREIGN PATENT DOCUMENTS

JP     2011245984 A   *   12/2011
JP     2020-097337 A     6/2020
WO   WO-2015177238 A1 * 11/2015 .......... B60W 30/143

OTHER PUBLICATIONS

Translation of JP-2011245984-A retrieved from Espacenet on Jan. 10, 2024 (Year: 2024).*
Translation of WO-2015177238-A1 retrieved from Espacenet on Jan. 10, 2024 (Year: 2024).*

*Primary Examiner* — Fadey S. Jabr
*Assistant Examiner* — Faris Asim Shaikh
(74) *Attorney, Agent, or Firm* — Dinsmore & Shohl LLP

(57) ABSTRACT

A driving assistance apparatus includes an estimator and a controller. The estimator estimates a first estimated vehicle speed and a second estimated vehicle speed when there are a first deceleration target and a second deceleration target in a course ahead of a vehicle, and when a driver of the vehicle releases an accelerator pedal. Wherein the first estimated vehicle speed is an estimated vehicle speed of the vehicle at a first target position corresponding to the first deceleration target, and the second estimated vehicle speed is an estimated vehicle speed of the vehicle at a second target position corresponding to the second deceleration target. The controller controls the vehicle to automatically decelerate toward the second target position when the first estimated vehicle speed is greater than a first predetermined value, and when the second estimated vehicle speed is less than a second predetermined value.

6 Claims, 6 Drawing Sheets

(51) Int. Cl.
  *B60W 40/105* (2012.01)
  *G06V 20/56* (2022.01)
  *G06V 20/58* (2022.01)

(52) U.S. Cl.
  CPC .......... *G06V 20/584* (2022.01); *G06V 20/588* (2022.01); *B60W 2540/10* (2013.01); *B60W 2552/30* (2020.02); *B60W 2552/53* (2020.02)

(58) Field of Classification Search
  CPC ....... B60W 2552/53; B60W 2520/105; B60W 30/17; B60W 30/18145; B60W 2554/802; B60W 2555/60; B60W 2720/103; B60W 2720/106; B60W 30/18109; B60W 30/143; B60W 30/18009; G06V 20/584; G06V 20/588
  See application file for complete search history.

(56) References Cited

U.S. PATENT DOCUMENTS

| | | | |
|---|---|---|---|
| 6,523,912 B1* | 2/2003 | Bond, III | B60R 21/01516 |
| | | | 701/70 |
| 2006/0220807 A1* | 10/2006 | Thompson | B60Q 1/50 |
| | | | 340/433 |
| 2014/0303868 A1* | 10/2014 | Otake | G08G 1/166 |
| | | | 701/70 |
| 2015/0153735 A1* | 6/2015 | Clarke | B60T 7/12 |
| | | | 701/301 |
| 2017/0113675 A1* | 4/2017 | Oguri | B60W 10/26 |
| 2017/0221358 A1* | 8/2017 | Kido | G08G 1/096 |
| 2018/0134262 A1* | 5/2018 | Kurahashi | B60W 50/12 |
| 2019/0031174 A1* | 1/2019 | Adachi | B60W 30/0956 |
| 2020/0189576 A1 | 6/2020 | Ikezawa et al. | |
| 2021/0139034 A1* | 5/2021 | Otake | B60W 50/0097 |
| 2021/0309254 A1* | 10/2021 | Murahashi | B60W 60/0015 |
| 2022/0105925 A1* | 4/2022 | Naserian | B60W 10/184 |

\* cited by examiner

DRIVING ASSISTANCE APPARATUS

CROSS-REFERENCE TO RELATED APPLICATIONS

This application is based upon and claims the benefit of priority of the prior Japanese Patent Application No. 2020-191425, filed on Nov. 18, 2020, the entire contents of which are incorporated herein by reference.

BACKGROUND

1. Technical Field

Embodiments of the present disclosure relate to a driving assistance apparatus.

2. Description of the Related Art

For this type of apparatus, for example, there is proposed an apparatus that performs a deceleration assistance control when there is a deceleration target, which requires a host vehicle to stop, in a course ahead of the host vehicle and when a driver releases an accelerator pedal (refer to Japanese Patent Application Laid Open No. 2020-097337 (Patent Literature 1)).

In a technology/technique disclosed in the Patent Literature 1, considered is only the deceleration target that is the closest to the host vehicle in the course ahead of the host vehicle. Here, for example, an installation distance of traffic lights recognized as the deceleration targets depends on a road structure (e.g., the position of intersections). Suppose that a first traffic light is located in the course ahead of the vehicle and a second traffic light is located in the deep side of the first traffic light and that a distance between the first traffic light and the second traffic light is relatively short. If the second traffic light is recognized as the deceleration target after the vehicle passes the first traffic light, a deceleration assistance for the second traffic light may be delayed, which is technically problematic.

SUMMARY

In view of the problem described above, it is therefore an object of embodiments of the present disclosure to provide a driving assistance apparatus that is configured to appropriately decelerate a vehicle even when there are two deceleration targets, which are located in relatively close proximity, in a course ahead of the vehicle.

The above object of embodiments of the present disclosure can be achieved by a driving assistance apparatus including: an estimator configured to estimate a first estimated vehicle speed and a second estimated vehicle speed when there is a traffic light as a first deceleration target in a course ahead of a vehicle and there is a second deceleration target on a deep side of the first deceleration target as viewed from the vehicle, and when a driver of the vehicle releases an accelerator pedal, wherein the first estimated vehicle speed is an estimated vehicle speed of the vehicle at a first target position corresponding to the first deceleration target, and the second estimated vehicle speed is an estimated vehicle speed of the vehicle at a second target position corresponding to the second deceleration target; and a controller programmed to control the vehicle to automatically decelerate toward the second target position, when the first estimated vehicle speed is greater than a first predetermined value and when the second estimated vehicle speed is less than a second predetermined value.

DETAILED DESCRIPTION OF THE EMBODIMENT

Figure 1:
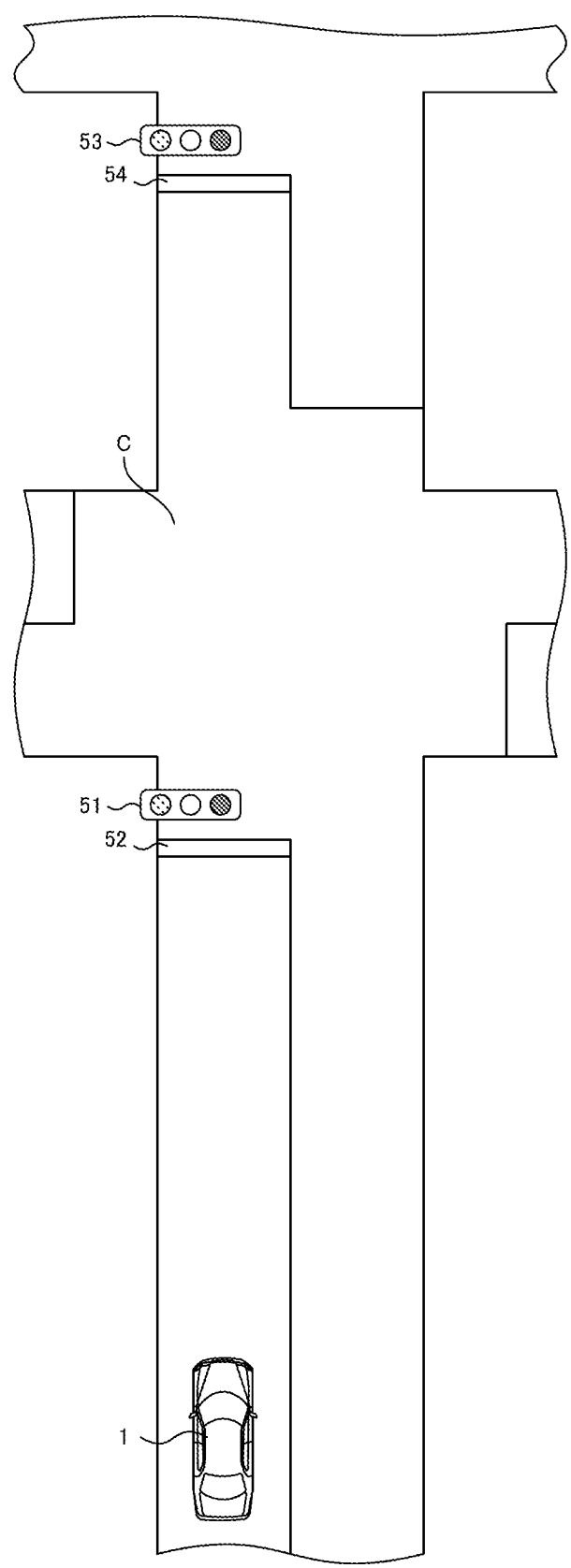
FIG. 1 is a diagram illustrating an example of a scene in which a deceleration assistance control according to an embodiment is applied.

A driving assistance apparatus according to an embodiment will be described with reference to FIG. 1 to FIG. 6. First, an outline of a deceleration assistance control performed by a driving assistance apparatus 100 (refer to FIG. 2) according to the embodiment will be described, and then, the driving assistance apparatus 100 will be specifically described.

(Deceleration Assistance Control)

The deceleration assistance control may be performed when there is a deceleration target in a course ahead of a host vehicle (e.g., a vehicle 1 in FIG. 1) and when a driver of the host vehicle releases an accelerator pedal (in other words, when the driver does not step on the accelerator pedal). When the deceleration assistance control is performed, the vehicle starts slow deceleration in which the vehicle decelerates relatively slowly.

The "deceleration target" requires the vehicle to decelerate or stop. Specific examples of the deceleration target may be a traffic light with a light color of "red" or "yellow", another vehicle ahead of the host vehicle (wherein another vehicle may be driving or may be stopped or parked), a curved road, a stop line (e.g., a stop line provided with a stop sign), and the like. That is, the deceleration target may include something that regulates the driving of the vehicle, an obstacle, and a road structure.

The deceleration assistance control will be specifically described with reference to FIG. 1. In a scene illustrated in FIG. 1, a traffic light 51 is located in the course ahead of the vehicle 1. Then, a traffic light 53 is located on a deep side of the traffic light 51 as viewed from the vehicle 1.

For example, if the traffic light 51 with a light color of "red" is recognized as the deceleration target by the driving assistance apparatus 100, the vehicle 1 may be automatically decelerated by the deceleration assistance control such that a vehicle speed of the vehicle 1 at a target position corresponding to the traffic light 51 (e.g., in the vicinity of a stop line 52) approaches a target vehicle speed (e.g., 0 km/h, etc.). That is, in this case, the deceleration assistance control for automatically decelerating the vehicle 1 toward the target position corresponding to the traffic light 51 with a light color of "red" may be performed.

For example, when there is a preceding vehicle (not illustrated) ahead of the vehicle 1, which is another vehicle that drives in the same direction as a direction of travel of the vehicle 1, and when the vehicle 1 is approaching the preceding vehicle (i.e., when the preceding vehicle is slower than the vehicle 1), the driving assistance apparatus 100 may recognize the preceding vehicle as the deceleration target. In this case, the vehicle 1 may be automatically decelerated by the deceleration assistance control such that the vehicle speed of the vehicle 1 at a target position corresponding to the preceding vehicle (e.g., a position that is away from a rear end of the preceding vehicle by a predetermined distance) approaches a target vehicle speed (e.g., a vehicle speed that allows a relative vehicle speed between the vehicle 1 and the preceding vehicle to be zero, etc.). That is, in this case, the deceleration assistance control for automatically decelerating the vehicle 1 toward the target position corresponding to the preceding vehicle may be performed.

In this case, the target position relative to the preceding vehicle recognized as the deceleration target (i.e., a relative target position) may or may not change depending on a change in a vehicle speed of the preceding vehicle in a period in which the deceleration assistance control is performed. On the other hand, an absolute target position moves with a movement of the preceding vehicle.

Incidentally, when the light color of the traffic light 51 is "yellow", the driver of the vehicle 1 may try to stop in front of the traffic light 51 (e.g., in the vicinity of the stop line 52), or may try to pass through an intersection C, depending on a distance between the vehicle 1 and the intersection C. In the former case (i.e., when the driver tries to stop in front of the traffic light 51), when the driver stops stepping on the accelerator pedal (in other words, when the driver releases the accelerator pedal), the deceleration assistance control for automatically decelerating the vehicle 1 toward the target position corresponding to the traffic light 51 may be performed.

In the latter case (i.e., when the driver tries to pass through the intersection C), the following problem may occur; namely, in some cases, after the vehicle 1 passes through the intersection C, it is determined whether or not to perform the deceleration assistance control on the traffic light 53 recognized as the deceleration target. At this time, when a distance between the traffic light 51 and the traffic light 53 is relatively close, even when it is determined that the deceleration assistance control is to be performed on the traffic light 53, there is a possibility that the deceleration assistance is delayed (in other words, it is hard to appropriately decelerate or stop the vehicle 1 by the deceleration assistance control).

Therefore, the driving assistance apparatus 100 is configured to determine whether or not to perform the deceleration assistance control with the traffic light 51 recognized as the deceleration target and to determine whether or not to perform the deceleration assistance control with the target the traffic light 53 recognized as the deceleration target, at the same time, for example, when recognizing both the traffic light 51 and the traffic light 53. With this configuration, for example, before the vehicle 1 passes the traffic light 51 (in other words, before the vehicle 1 enters the intersection C), it is possible to determine whether or not to perform the deceleration assistance control with the traffic light 53 recognized as the deceleration target. Therefore, even when the distance between the traffic light 51 and the traffic light 53 is relatively close, it is possible to appropriately perform the deceleration assistance on the traffic light 53.

(Driving Assistance Apparatus)

Figure 2:
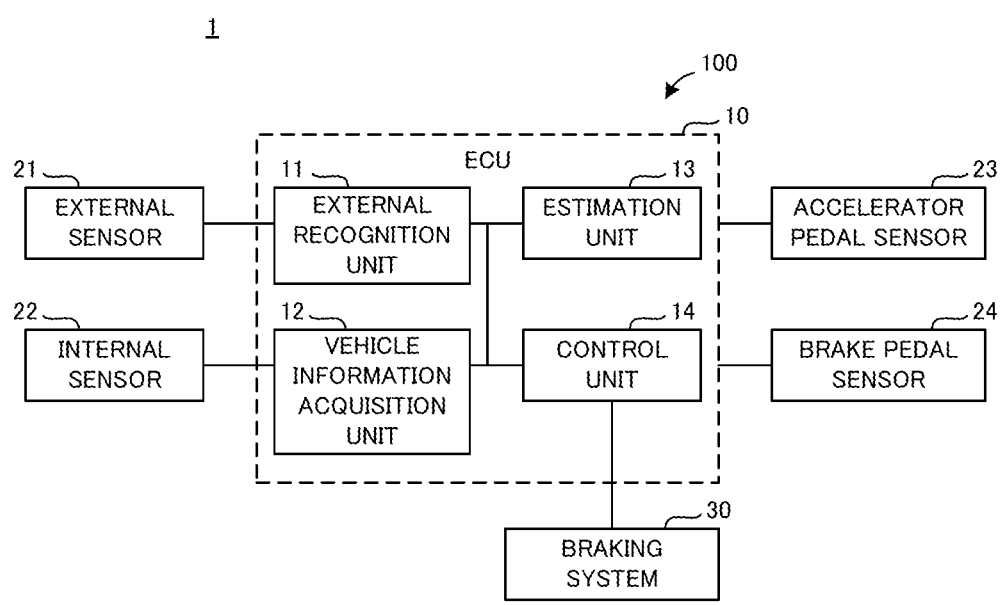
FIG. 2 is a block diagram illustrating a configuration of a driving assistance apparatus according to the embodiment.

The driving assistance apparatus 100 will be described with reference to FIG. 2 to FIG. 4. In FIG. 2, the driving assistance apparatus 100 is provided with an ECU (Electronic Control Unit) 10. That is, in the embodiment, at least a part of the functions of the ECU 10 is used as at least a part of the driving assistance apparatus 100. The ECU10 as at least a part of the driving assistance apparatus 100 includes therein an external recognition unit 11, a vehicle information acquisition unit 12, an estimation unit 13, and a control unit 14, as a processing block that is logically realized therein or a processing circuit that is physically realized therein.

The external recognition unit 11 recognizes at least one of a position, a speed, a shape, a color, and the like relating to an object (e.g., a stationary object, a moving object) that exists around the vehicle 1, on the basis of an output (e.g., object information, image information, etc.) of the external sensor 21, which is, for example, a millimeter-wave radar, a camera, a LiDAR (Light Detection and Ranging), or the like. Here, the position relating to the object may be represented by a relative position to the vehicle 1. Similarly, the speed relating to the object may be represented by a relative speed to the vehicle 1. Since various existing aspects can be applied to a method of recognizing an object, a detailed description of the method will be omitted.

The vehicle information acquisition unit 12 obtains vehicle information relating to the vehicle 1 (e.g., information indicating the behavior of the vehicle 1 such as a speed and acceleration, etc.) on the basis of an output of the internal sensor 22 such as, for example, a speed sensor and an acceleration sensor. Since various existing aspects can be applied to a method of obtaining the vehicle information, a detailed description of the method will be omitted.

The estimation unit 13 estimates a first estimated vehicle speed and a second estimated vehicle speed when there is a traffic light (e.g., the traffic light 51 in FIG. 1) as a first deceleration target in the course ahead of the vehicle 1 and there is a second deceleration target (e.g., the traffic light 53 in FIG. 1) on a deep side of the first deceleration target as viewed from the vehicle 1, and when the driver of the vehicle 1 releases the accelerator pedal, wherein the first estimated vehicle speed is an estimated vehicle speed of the vehicle 1 at a first target position (e.g., in the vicinity of the stop line 52 in FIG. 1) corresponding to the first deceleration target, and the second estimated vehicle speed is an estimated vehicle speed of the vehicle 1 at a second target position (e.g., in the vicinity of a stop line 54 in FIG. 1) corresponding to the second deceleration target.

Incidentally, the estimation unit 13 may recognize the presence of the first deceleration target and the second deceleration target from a recognition result of the external recognition unit 11. Moreover, the estimation unit 13 may recognize that the driver releases the accelerator pedal from a detection result of the accelerator pedal sensor 23.

The estimation unit 13 may estimate the estimated vehicle speed, for example, as follows. The estimation unit 13 may calculate (estimate) the vehicle speed when the vehicle 1 arrives at the target position, on the basis of a current vehicle speed of the vehicle 1, a distance from the vehicle 1 to the target position, and a deceleration relating to the deceleration assistance control (in other words, assuming that the vehicle 1 is decelerated by the deceleration assistance control), and may set the calculated (estimated) vehicle speed as the estimated vehicle speed. Here, the deceleration relating to the deceleration assistance control is in a deceleration range in which the deceleration is allowed to be generated by the deceleration assistance control.

The control unit 14 controls the vehicle 1 (specifically, a braking system 30) to automatically decelerate toward the second target position corresponding to the second deceleration target when the first estimated vehicle speed is greater than a first predetermined value and the second estimated vehicle speed is less than a second predetermined value.

Here, the "first predetermined value" is a value for determining whether or not to control the vehicle 1 to automatically decelerate toward the first target position corresponding to the first deceleration target (in other words, whether or not to perform the deceleration assistance control on the first deceleration target). Similarly, the second predetermined value is a value for determining whether or not to control the vehicle 1 to automatically decelerate toward the second target position corresponding to the second deceleration target (in other words, whether or not to perform the deceleration assistance control on the second deceleration target). Each of the first predetermined value and the second predetermined value may be a predetermined fixed value, or may be a variable value corresponding to some physical quantity or parameter.

When the vehicle speed of the vehicle 1 is brought close to 0 km per hour (in other words, when the vehicle 1 is stopped) by the deceleration assistance control, the first predetermined value may be set, for example, as a vehicle speed that allows the vehicle 1 to be safely stopped in the vicinity of the first target position by the driver of the vehicle 1 operating a brake pedal (i.e., by the driver stepping on the brake pedal) at the first target position. When the vehicle speed of the vehicle 1 is brought close to the target vehicle speed that is greater than 0 km per hour (in other words, the vehicle 1 is not stopped but decelerated) by the deceleration assistance control, the first predetermined value may be set, for example, as a vehicle speed that allows the vehicle 1 to safely pass the first target position while avoiding a collision between the vehicle 1 and the first deceleration target.

Similarly, when the vehicle speed of the vehicle 1 is brought close to 0 km per hour (in other words, when the vehicle 1 is stopped) by the deceleration assistance control, the second predetermined value may be set, for example, as a vehicle speed that allows the vehicle 1 to be safely stopped in the vicinity of the second target position by the driver of the vehicle 1 operating the brake pedal (i.e., by the driver stepping on the brake pedal) at the second target position. When the vehicle speed of the vehicle 1 is brought close to the target vehicle speed that is greater than 0 km per hour (in other words, the vehicle 1 is not stopped but decelerated) by the deceleration assistance control, the second predetermined value may be set, for example, as a vehicle speed that allows the vehicle 1 to safely pass the second target position while avoiding a collision between the vehicle 1 and the second deceleration target. Note that the second predetermined value may be the same as the first predetermined value or may be different from the first predetermined value.

The external sensor 21, the internal sensor 22, the accelerator pedal sensor 23 and the brake pedal sensor 24 may be provided uniquely by the driving assistance apparatus 100, or may be shared with other apparatuses and systems. Since various existing aspects can be applied to the braking system 30, a detailed description of the braking system 30 will be omitted.

Operations of the driving assistance apparatus 100 will be described with reference to a flowchart in FIG. 3 in addition to FIG. 1 and FIG. 2. A case described here is that the traffic light is the deceleration target; however, the operations of the driving assistance apparatus 100 are not limited to this case.

Figure 3:
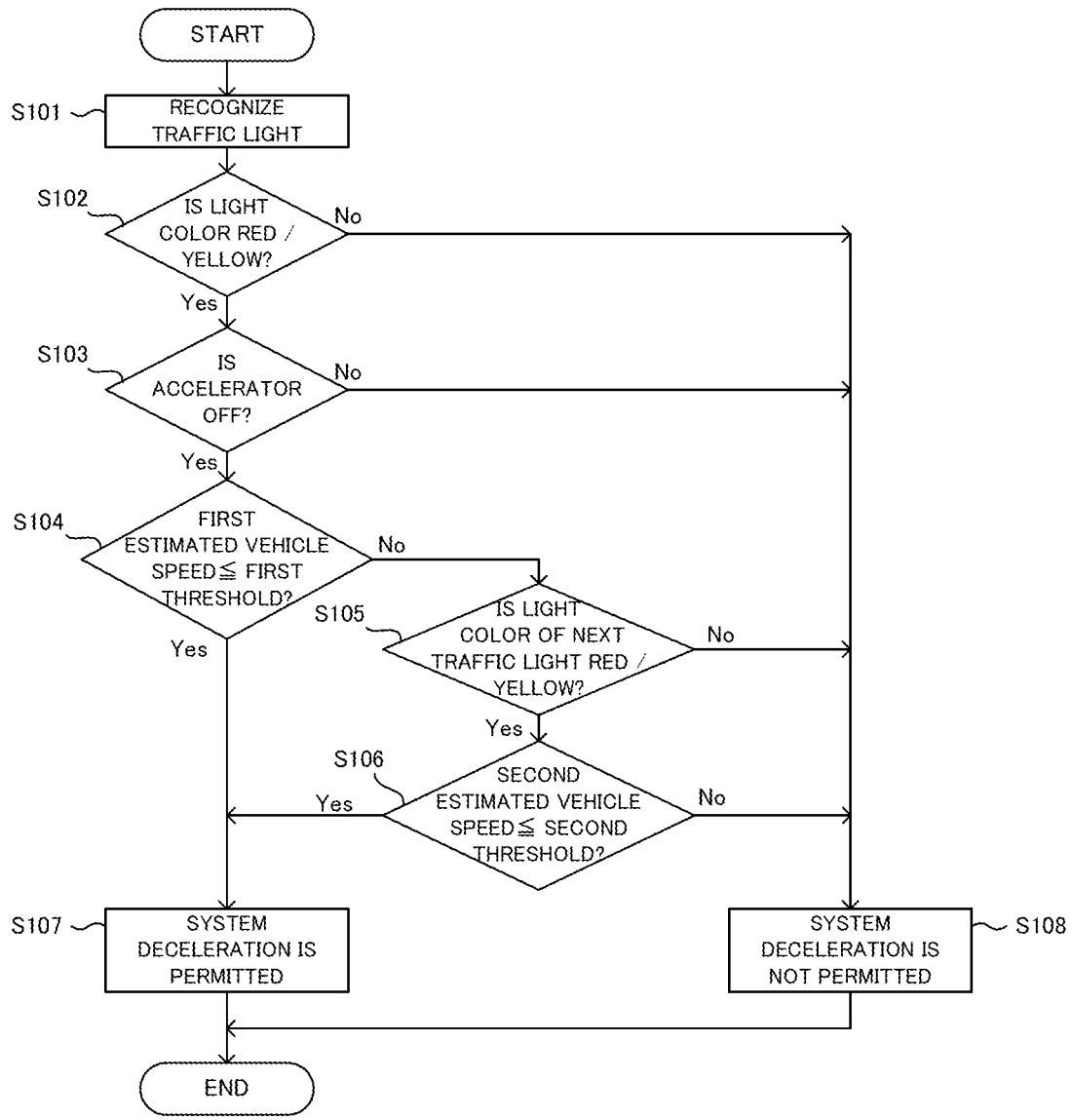
FIG. 3 is a flowchart illustrating operations of the driving assistance apparatus according to the embodiment.

In FIG. 3, the external recognition unit 11 of the driving assistance apparatus 100 recognizes a traffic light in the course ahead of the vehicle 1 (step S101). Here, suppose that the traffic light 51 and the traffic light 53 (refer to FIG. 1) are recognized in the step S101. In other words, in the step S101, the external recognition unit 11 recognizes an object (for example, the traffic light) that is in the course ahead of the vehicle 1, as a deceleration target candidate. The driving assistance apparatus 100 determines whether or not the light color of the traffic light 51, which is the closest traffic light to the vehicle 1 in the course ahead of the vehicle 1, is "red" or "yellow" (step S102). In other words, in the step S102, it is determined whether or not the object recognized as the deceleration target candidate is the deceleration target. The step S102 may be performed by the external recognition unit 11, may be performed by the estimation unit 13, or may be performed by another processing block or processing circuit that is different from the external recognition unit 11 and the estimation unit 13.

In the step S102, when it is determined that the light color of the traffic light 51 is neither "red" nor "yellow" (i.e., the light color is "green") (the step S102: No), the automatic deceleration of the vehicle 1 by the deceleration assistance control (corresponding to "system deceleration" in FIG. 3) is not permitted because the traffic light 51 does not fall under the deceleration target (step S108). Then, the step S101 may be performed after a lapse of a predetermined time (e.g., several tens of milliseconds to several hundred milliseconds, etc.). That is, the operations illustrated in FIG. 3 may be repeated in a cycle corresponding to the predetermined time.

In the step S102, when it is determined that the light color of the traffic light 51 is "red" or "yellow" (the step S102: Yes), the traffic light 51 is recognized as the deceleration target. Then, on the basis of the detection result of the accelerator pedal sensor 23, it is determined whether or not the driver of the vehicle 1 releases the accelerator pedal (in other words, whether or not an accelerator is off) (step S103). The step 103 may be performed by the estimation unit 13, or may be performed by another processing block or processing circuit that is different from the estimation unit 13.

In the step S103, when it is determined that the driver does not release the accelerator pedal (in other words, the driver steps on the accelerator pedal) (the step S103: No), the automatic deceleration of the vehicle 1 by the deceleration assistance control is not permitted because the driver has no intention to decelerate (the step S108). Then, the step S101 may be performed after a lapse of the predetermined time.

In the step S103, when it is determined that the driver releases the accelerator pedal (the step S103: Yes), the estimation unit 13 estimates the first estimated vehicle speed of the vehicle 1 at the first target position (e.g., in the vicinity of the stop line 52 in FIG. 1) corresponding to the traffic light 51. As described above, the estimation unit 13 estimates the first estimated vehicle speed on the assumption that the vehicle 1 is decelerated by the deceleration assistance control (in other words, on the assumption that the vehicle 1 decelerates at a predetermined deceleration). Then, the control unit 14 determines whether or not the first estimated vehicle speed is less than or equal to a first threshold value (corresponding to the "first predetermined value" described above) (step S104).

In the step S104, when it is determined that the first estimated vehicle speed is less than or equal to the first threshold value (the step S104: Yes), the automatic deceleration of the vehicle 1 by the deceleration assistance control is permitted (the step S107). As a result, the control unit 14 controls the braking system 30 to automatically decelerate the vehicle 1 toward the first target position corresponding to the traffic light 51. That is, the deceleration assistance control is performed on the traffic light 51 recognized as the deceleration target.

In the step S104, when it is determined that the first estimated vehicle speed is greater than the first threshold value (the step S104: No), the driving assistance apparatus 100 determines whether or not the light color of the traffic light 53, which is located on the deep side of the traffic light 51 as viewed from the vehicle 1, is "red" or "yellow" in the course ahead of the vehicle 1 (step S105). In other words, in the step S105, as in the step S102 described above, it is determined whether or not the object recognized as the deceleration target candidate is the deceleration target. The step S105 may be performed by the external recognition unit 11, may be performed by the estimation unit 13, or may be performed by another processing block or processing circuit that is different from the external recognition unit 11 and the estimation unit 13.

In the step S105, when it is determined that the light color of the traffic light 53 is neither "red" nor "yellow" (i.e., the light color is "green") (the step S105: No), the automatic deceleration of the vehicle 1 by the deceleration assistance control is not permitted because the traffic light 53 does not fall under the deceleration target (the step S108). Then, the step S101 may be performed after a lapse of the predetermined time.

In the step S105, when it is determined that the light color of the traffic light 53 is "red" or "yellow" (the step S105: Yes), the traffic light 53 is recognized as the deceleration target. Then, the estimation unit 13 estimates the second estimated vehicle speed of the vehicle 1 at the second target position (e.g., in the vicinity of the stop line 54 in FIG. 1) corresponding to the traffic light 53. As described above, the estimation unit 13 estimates the second estimated vehicle speed on the assumption that the vehicle 1 is decelerated by the deceleration assistance control (in other words, on the assumption that the vehicle 1 decelerates at a predetermined deceleration). Then, the control unit 14 determines whether or not the second estimated vehicle speed is less than or equal to a second threshold value (corresponding to the "second predetermined value" described above) (step S106).

In the step S106, when it is determined that the second estimated vehicle speed is greater than the second threshold value (the step S106: No), the automatic deceleration of the vehicle 1 by the deceleration assistance control is not permitted (the step S108). Then, the step S101 may be performed after a lapse of the predetermined time.

In the step S106, when it is determined that the second estimated vehicle speed is less than or equal to the second threshold value (the step S106: Yes), the automatic deceleration of the vehicle 1 by the deceleration assistance control is permitted (the step S107). As a result, the control unit 14 controls the braking system 30 to automatically decelerate the vehicle 1 toward the second target position corresponding to the traffic light 53. That is, the deceleration assistance control is performed on the traffic light 53 as the deceleration target.

Figure 4A:
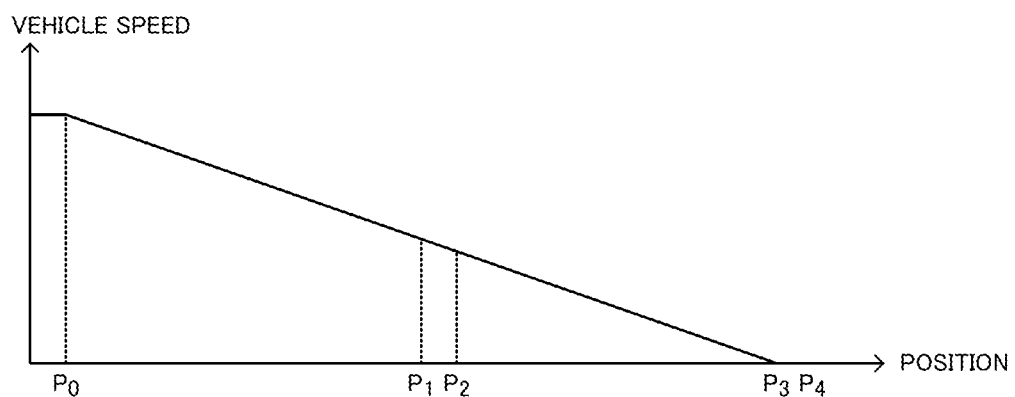
FIG. 4A is a diagram illustrating an example of a change in a vehicle speed by the deceleration assistance control according to the embodiment.
Figure 4B:
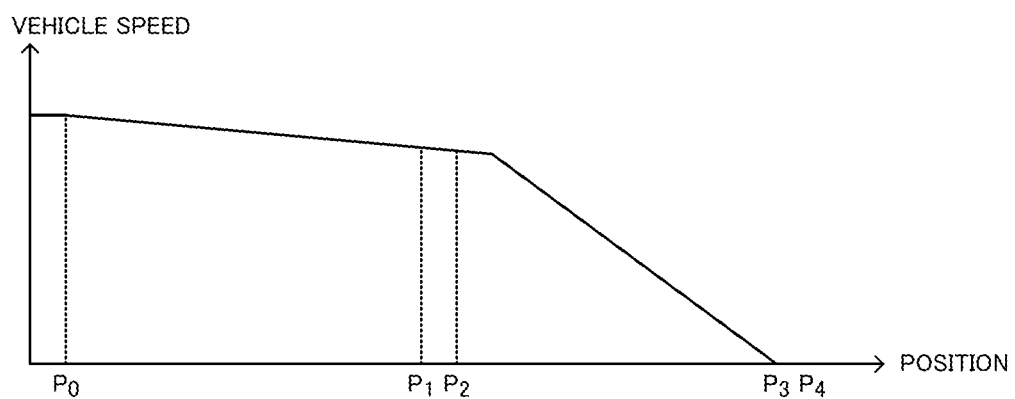
FIG. 4B is a diagram illustrating another example of a change in a vehicle speed by the deceleration assistance control according to the embodiment.

Here, the deceleration assistance control for the traffic light 53 recognized as the deceleration target will be described with reference to FIG. 4A and FIG. 4B. In FIG. 4A and FIG. 4B, a position P0 shall be a position of the vehicle 1 at a time when the deceleration assistance control is permitted. A position P2 is the position of the traffic light 51 recognized as the deceleration target. A position P1 is the first target position (e.g., a position in the vicinity of the stop line 52) corresponding to the traffic light 51 recognized as the deceleration target. A position P4 is the position of the traffic light 53 recognized as the deceleration target. A position P3 is the second target position (e.g., a position in the vicinity of the stop line 54) corresponding to the traffic light 53 recognized as the deceleration target.

In the deceleration assistance control for the traffic light 53 recognized as the deceleration target, for example, as illustrated in FIG. 4A, the control unit 14 may control the braking system 30 to decelerate the vehicle 1 immediately after the deceleration assistance control is permitted (in other words, before the vehicle 1 passes the traffic light 51 recognized as the deceleration target). Alternatively, in the deceleration assistance control for the traffic light 53 recognized as the deceleration target, for example, as illustrated in FIG. 4B, the control unit 14 may control the braking system 30 to decelerate the vehicle 1 after the vehicle 1 passes the traffic light 51 recognized as the deceleration target. In this case, since the driver of the vehicle 1 releases the accelerator pedal at the position P0, even before the start of the deceleration assistance control for the traffic light 53 recognized as the deceleration target is started, the vehicle 1 decelerates, for example, due to friction between tires of the vehicle and a road surface or for similar reasons.

In the operations in FIG. 3, if it is detected by the brake pedal sensor 24 that the driver of the vehicle 1 steps on the brake pedal after releasing the accelerator pedal, the automatic deceleration of the vehicle 1 by the deceleration assistance control may not be permitted, or the automatic deceleration of the vehicle 1 by the deceleration assistance control may be permitted on condition that a deceleration corresponding to stepping on the brake pedal by the driver (e.g., a driver-requested deceleration) is less than the deceleration relating to the deceleration assistance control.

(Technical Effects)

As described above, the driving assistance apparatus 100 is configured to determine whether or not to perform the deceleration assistance control on the second deceleration target before the vehicle 1 passes the first deceleration target (e.g., the traffic light 51 in FIG. 1). Therefore, according to the driving assistance apparatus 100, even when a distance between the first deceleration target and the second deceleration target is relatively short, it is possible to appropriately perform the deceleration assistance control on the second deceleration target. That is, for example, in a comparative example in which it is determined whether or not to perform the deceleration assistance control on the second deceleration target after the vehicle 1 passes the first deceleration target, when the distance between the first deceleration target and the second deceleration target is relatively short, the start of the deceleration assistance control for the second deceleration target may be delayed. In contrast, in the driving assistance apparatus 100, it is possible to determine whether or not to perform the deceleration assistance control on the second deceleration target before the vehicle 1 passes the first deceleration target. Thus, even when the distance between the first deceleration target and the second deceleration target is relatively short, it is possible to appropriately perform the deceleration assistance control on the second deceleration target.

First Modified Example

Figure 5:
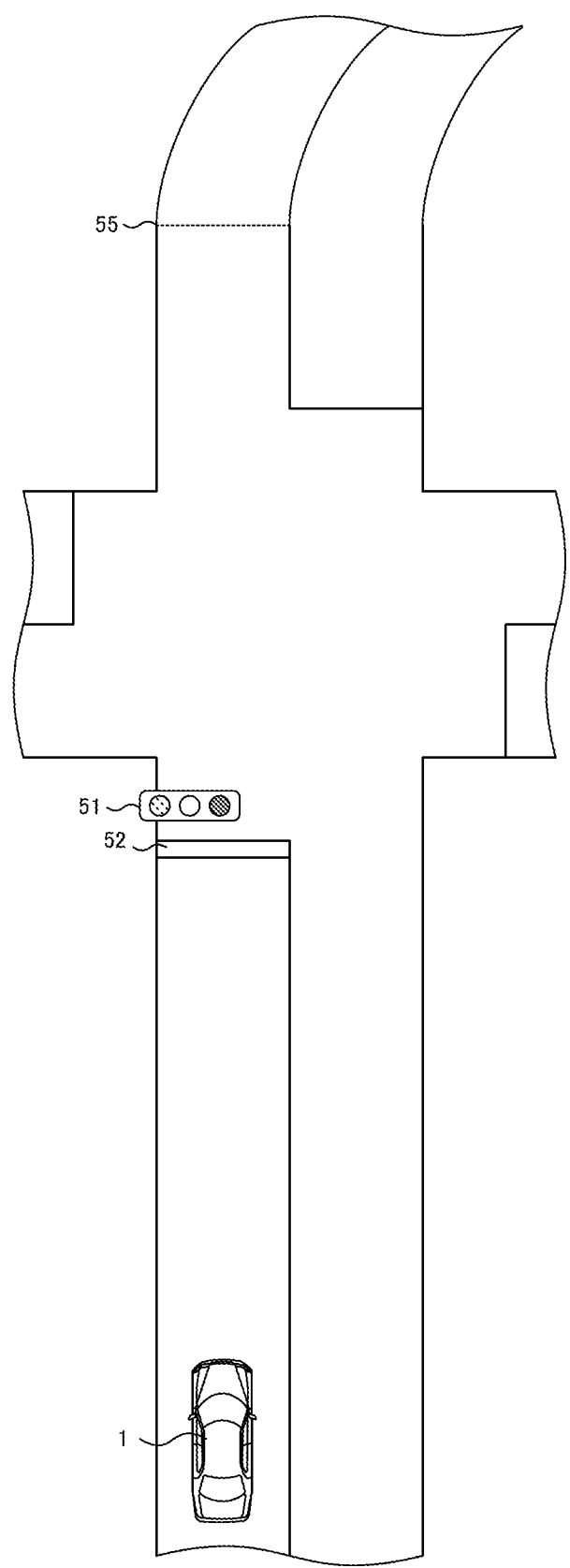
FIG. 5 is a diagram illustrating another example of the scene in which the deceleration assistance control according to the embodiment is applied.

With reference to FIG. 5, provided is a description of the operations of the driving assistance apparatus 100 when the first deceleration target is a traffic light and the second deceleration target is a curved road. In FIG. 5, there is a traffic light 51 in a course ahead of the vehicle 1, and there is a curved road on the deep side of the traffic light 51 as viewed from the vehicle 1. Here, if the curved road is the deceleration target, a target position corresponding to the curved road may be, for example, a position 55 corresponding to an entrance of the curved road.

In the same process as in the step S101 described above, the external recognition unit 11 recognizes the traffic light 51 and the curved road. In the same process as in the step S102 described above, the driving assistance apparatus 100 determines whether or not the light color of the traffic light 51, which is the closest to the vehicle 1 out of the traffic light 51 and the curved road, is "red" or "yellow". When it is determined that the light color of the traffic light 51 is neither "red" nor "yellow" (i.e., the light color is "green"), the automatic deceleration of the vehicle 1 by the deceleration assistance control is not permitted.

When it is determined that the light color of the traffic light 51 is "red" or "yellow", the traffic light 51 is recognized as the deceleration target. Then, in the same process as in the step S103 described above, it is determined whether or not the driver of the vehicle 1 releases the accelerator pedal (in other words, whether or not the accelerator is off), on the basis of the detection result of the accelerator pedal sensor 23.

When it is determined that the driver does not release the accelerator pedal (in other words, the driver steps on the accelerator pedal), the automatic deceleration of the vehicle 1 by the deceleration assistance control is not permitted.

When it is determined that the driver releases the accelerator pedal, in the same process as in the step S104 described above, the estimation unit 13 estimates the first estimated vehicle speed of the vehicle 1 at the first target position (e.g., in the vicinity of the stop line 52 in FIG. 5) corresponding to the traffic light 51 recognized as the deceleration target. Then, in the same process as in the step S105 described above, the control unit 14 determines whether or not the first estimated vehicle speed is less than or equal to the first threshold value.

When it is determined that the first estimated vehicle speed is less than or equal to the first threshold value, the automatic deceleration of the vehicle 1 by the deceleration assistance control is permitted. As a result, the control unit 14 controls the braking system 30 to automatically decelerate the vehicle 1 toward the first target position corresponding to the traffic light 51 recognized as the deceleration target. That is, the deceleration assistance control is performed on the traffic light 51 as the deceleration target.

When it is determined that the first estimated vehicle speed is greater than the first threshold value, the estimation unit 13 estimates the second estimated vehicle speed of the vehicle 1 at the second target position (e.g., the position 55 in FIG. 5) corresponding to the curved road recognized as the deceleration target. Incidentally, when it is determined that the vehicle 1 enters the curved road, for example, on the basis of a route information about a route of the vehicle 1 obtained from a navigation apparatus (not illustrated), the curved road may be recognized as the deceleration target and the estimation unit 13 may estimate the second estimated vehicle speed. Then, in the same process as in the step S106 described above, the control unit 14 determines whether or not the second estimated vehicle speed is less than or equal to the second threshold value.

When it is determined that the second estimated vehicle speed is greater than the second threshold value, the automatic deceleration of the vehicle 1 by the deceleration assistance control is not permitted. On the other hand, when it is determined that the second estimated vehicle speed is less than or equal to the second threshold value, the automatic deceleration of the vehicle 1 by the deceleration assistance control is permitted. As a result, the control unit 14 controls the braking system 30 to automatically decelerate the vehicle 1 toward the second target position corresponding to the curved road recognized as the deceleration target. That is, the deceleration assistance control is performed on the curved road recognized as the deceleration target.

Second Modified Example

Figure 6:
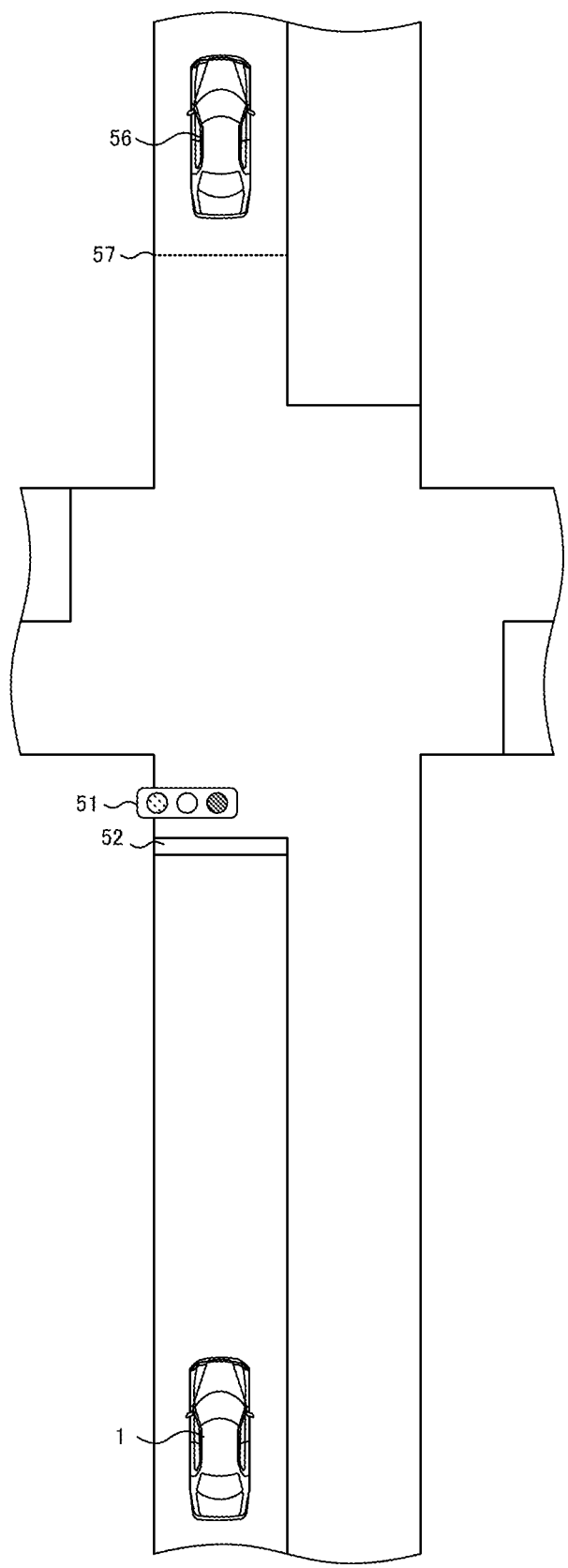
FIG. 6 is a diagram illustrating another example of the scene in which the deceleration assistance control according to the embodiment is applied.

With reference to FIG. 6, provided is a description of the operations of the driving assistance apparatus 100 when the first deceleration target is a traffic light and the second deceleration target is a preceding vehicle 56. In FIG. 6, there is a traffic light 51 in a course ahead of the vehicle 1, and there is the preceding vehicle 56 on the deep side of the traffic light 51 as viewed from the vehicle 1. If the preceding vehicle 56 is the deceleration target, a target position corresponding to the preceding vehicle 56 may be, for example, a position 57 that is away from a rear end of the preceding vehicle 56 by a predetermined distance.

In the same process as in the step S101 described above, the external recognition unit 11 recognizes the traffic light 51 and the preceding vehicle 56. In the same process as in the step S102 described above, the driving assistance apparatus 100 determines whether or not the light color of the traffic light 51, which is the closest to the vehicle 1 out of the traffic light 51 and the preceding vehicle 56, is "red" or "yellow". When it is determined that the light color of the traffic light 51 is neither "red" nor "yellow" (i.e., the light color is "green"), the automatic deceleration of the vehicle 1 by the deceleration assistance control is not permitted.

When it is determined that the light color of the traffic light 51 is "red" or "yellow", the traffic light 51 is recognized as the deceleration target. Then, in the same process as in the step S103 described above, it is determined whether or not the driver of the vehicle 1 releases the accelerator pedal (in other words, whether or not the accelerator is off), on the basis of the detection result of the accelerator pedal sensor 23.

When it is determined that the driver does not release the accelerator pedal (in other words, the driver steps on the accelerator pedal), the automatic deceleration of the vehicle 1 by the deceleration assistance control is not permitted.

When it is determined that the driver releases the accelerator pedal, in the same process as in the step S104 described above, the estimation unit 13 estimates the first estimated vehicle speed of the vehicle 1 at the first target position (e.g., in the vicinity of the stop line 52 in FIG. 6) corresponding to the traffic light 51 recognized as the deceleration target. Then, in the same process as in the step S105 described above, the control unit 14 determines whether or not the first estimated vehicle speed is less than or equal to the first threshold value.

When it is determined that the first estimated vehicle speed is less than or equal to the first threshold value, the automatic deceleration of the vehicle 1 by the deceleration assistance control is permitted. As a result, the control unit 14 controls the braking system 30 to automatically decelerate the vehicle 1 toward the first target position corresponding to the traffic light 51 recognized as the deceleration target. That is, the deceleration assistance control is performed on the traffic light 51 recognized as the deceleration target.

When it is determined that the first estimated vehicle speed is greater than the first threshold value, the estimation unit 13 estimates the second estimated vehicle speed of the vehicle 1 at the second target position (e.g., the position 57 in FIG. 6) corresponding to the preceding vehicle 56 recognized as the deceleration target. Incidentally, for example, when a TTC (Time To Collision), which is calculated on the basis of a relative position and a relative speed of the preceding vehicle 56 to the vehicle 1, is less than an allowable time, the preceding vehicle 56 may be recognized as the deceleration target and the estimation unit 13 may estimate the second estimated vehicle speed. Then, in the same process as in the step S106 described above, the control unit 14 determines whether or not the second estimated vehicle speed is less than or equal to the second threshold value.

When it is determined that the second estimated vehicle speed is greater than the second threshold value, the automatic deceleration of the vehicle 1 by the deceleration assistance control is not permitted. On the other hand, when it is determined that the second estimated vehicle speed is less than or equal to the second threshold value, the automatic deceleration of the vehicle 1 by the deceleration assistance control is permitted. As a result, the control unit 14 controls the braking system 30 to automatically decelerate the vehicle 1 toward the second target position corresponding to the preceding vehicle 56 recognized as the deceleration target. That is, the deceleration assistance control is performed on the preceding vehicle 56 recognized as the deceleration target.

Third Modified Example

When the light color of a traffic light is recognized from images captured by a camera, which is the external sensor 21, a housing of the traffic light is relatively clearly captured in the daytime in many cases. In contrast, at night, the housing of the traffic light is unclear, but only the light of the traffic light is relatively clearly captured in many cases. Moreover, even in the daytime, when the traffic light is in the sun light, it may be hard to determine the color of the traffic light. In other words, there is a possibility that the light color of the traffic light may be erroneously recognized depending on the weather or time zone.

Therefore, for example, when recognizing an object around the vehicle 1, such as a traffic light, the external recognition unit 11 of the driving assistance apparatus 100 may determine a probability of a recognition result for each recognized object. Since various existing aspects can be applied to a method of determining the probability of the recognition result, a detailed description of the method will be omitted.

The control unit 14 of the driving assistance apparatus 100 may control the braking system 30 to automatically decelerate the vehicle 1 at a deceleration corresponding to the probability of the recognition result for the traffic light 51 or the traffic light 53 when the deceleration assistance control is permitted for the traffic light 51 or the traffic light 53 recognized as the deceleration target. Specifically, the control unit 14 may control the braking system 30 to automatically decelerate the vehicle 1 at a large deceleration when the probability of the recognition result for one of the traffic light 51 and the traffic light 53 is high, as compared with when the probability of the recognition result of the one of the traffic lights is low. In other words, the control unit 14 may control the braking system 30 to automatically decelerate the vehicle 1 at a small deceleration when the probability of the recognition result of the one of the traffic lights is low, as compared with when the probability of the recognition result of one of the signals is high.

In the operations illustrated in FIG. 3 described above, for example, in the step S104, when it is determined that the first estimated vehicle speed is less than or equal to the first threshold value (the step S104: Yes), the automatic deceleration of the vehicle 1 by the deceleration assistance control is permitted (the step S107). As a result, the control unit 14 may control the braking system 30 to automatically decelerate the vehicle 1 at the deceleration corresponding to the probability of the recognition result for the traffic light 51 recognized as the deceleration target, toward the first target position corresponding to the traffic light 51 recognized as the deceleration target.

For example, in the step S106, when it is determined that the second estimated vehicle speed is less than or equal to the second threshold value (the step S106: Yes), the automatic deceleration of the vehicle 1 by the deceleration assistance control is permitted (the step S107). As a result, the control unit 14 may control the braking system 30 to automatically decelerate the vehicle 1 at the deceleration corresponding to the probability of the recognition result for the traffic light 53 recognized as the deceleration target, toward the second target position corresponding to the traffic light 53 recognized as the deceleration target.

The physical quantity or parameter that is changed in accordance with the probability of the recognition result for an object (e.g., a traffic light) is not limited to the deceleration, but may be, for example, a deceleration start timing, an amount of deceleration, a deceleration gradient or the like. Moreover, there may be not only one but a plurality of physical quantities or parameters that are changed in accordance with the probability of the recognition result for the object (e.g., the deceleration and the deceleration start timing may be changed).

Various aspects of embodiments of the present disclosure derived from the embodiment and the modified examples described above will be explained hereinafter.

A driving assistance apparatus according to an aspect of embodiments of the present disclosure includes: an estimator configured to estimate a first estimated vehicle speed and a second estimated vehicle speed when there is a traffic light as a first deceleration target in a course ahead of a vehicle and there is a second deceleration target on a deep side of the first deceleration target as viewed from the vehicle, and when a driver of the vehicle releases an accelerator pedal, wherein the first estimated vehicle speed is an estimated vehicle speed of the vehicle at a first target position corresponding to the first deceleration target, and the second estimated vehicle speed is an estimated vehicle speed of the vehicle at a second target position corresponding to the second deceleration target; and a controller programmed to control the vehicle to automatically decelerate toward the second target position, when the first estimated vehicle speed is greater than a first predetermined value and when the second estimated vehicle speed is less than a second predetermined value.

In the embodiment described above, the "estimation unit 13" corresponds to an example of the "estimator", and the "control unit 14" corresponds to an example of the "controller". In the embodiment described above, the "traffic light 51 with a light color of red or yellow" corresponds to an example of the "traffic light as the first deceleration target", and the "traffic light 53 with a light color of red or yellow", the "curved road" and the "preceding vehicle 56" correspond to an example of the "second deceleration target".

In the driving assistance apparatus, the second deceleration target may be a traffic light, a curve, a stop line or another vehicle.

In the driving assistance apparatus, the controller may control the vehicle to automatically decelerate toward the second target position before the vehicle passes the first deceleration target, when the first estimated vehicle speed is greater than the first predetermined value and when the second estimated vehicle speed is less than the second predetermined value.

In the driving assistance apparatus, the controller may control the vehicle to automatically decelerate toward the second target position after the vehicle passes the first deceleration target, when the first estimated vehicle speed is greater than the first predetermined value and when the second estimated vehicle speed is less than the second predetermined value.

In the driving assistance apparatus, the estimator may estimate the first estimated vehicle speed and the second estimated vehicle speed on the assumption that the vehicle decelerates at a predetermined deceleration.

In the driving assistance apparatus, it may further include a recognizer configured to recognize the first deceleration target and the second deceleration target, wherein the controller may control the vehicle to automatically decelerate toward the second target position at a deceleration corresponding to a probability of recognition of the second deceleration target by the recognizer, when the first estimated vehicle speed is greater than the first predetermined value and the second estimated vehicle speed is less than the second predetermined value. In the embodiment described above, the "external recognition unit 11" corresponds to an example of the "recognizer".

The present disclosure may be embodied in other specific forms without departing from the spirit or characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A driving assistance apparatus comprising an electronic control unit configured to:
   estimate a first estimated vehicle speed and a second estimated vehicle speed when there is a first deceleration target in a course ahead of a vehicle and there is a second deceleration target on a deep side of the first deceleration target as viewed from the vehicle, and when a driver of the vehicle releases an accelerator pedal, wherein the first deceleration target is a first traffic light, a light color of which is red or yellow, wherein the second deceleration target is a second traffic light, a light color of which is red or yellow, a curve, a stop line or another vehicle, wherein the first estimated vehicle speed is an estimated vehicle speed of the vehicle at a first target position corresponding to the first deceleration target, and the second estimated vehicle speed is an estimated vehicle speed of the vehicle at a second target position corresponding to the second deceleration target;
   determine whether the first estimated vehicle speed is less than or equal to a first predetermined value;
   upon determination that the first estimated vehicle speed is not less than or equal to the first predetermined value, determine whether a second light color of a second traffic light ahead of the vehicle beyond the first traffic light is red or yellow; and
   control the vehicle to automatically decelerate toward the second target position, when the first estimated vehicle speed is greater than the first predetermined value and when the second estimated vehicle speed is less than a second predetermined value.

2. The driving assistance apparatus according to claim 1, wherein the electronic control unit is further configured to control the vehicle to automatically decelerate toward the second target position before the vehicle passes the first deceleration target, when the first estimated vehicle speed is greater than the first predetermined value and when the second estimated vehicle speed is less than the second predetermined value.

3. The driving assistance apparatus according to claim 1, wherein the electronic control unit is further configured to control the vehicle to automatically decelerate toward the second target position after the vehicle passes the first deceleration target, when the first estimated vehicle speed is greater than the first predetermined value and when the second estimated vehicle speed is less than the second predetermined value.

4. The driving assistance apparatus according to claim 1, wherein the electronic control unit is further configured to estimate the first estimated vehicle speed and the second estimated vehicle speed on the assumption that the vehicle decelerates at a predetermined deceleration.

5. The driving assistance apparatus according to claim 1, the electronic control unit is further configured to recognize the first deceleration target and the second deceleration target, wherein
   the electronic control unit is further configured to control the vehicle to automatically decelerate toward the second target position at a deceleration corresponding to a probability of recognition of the second deceleration target by the recognizer, when the first estimated vehicle speed is greater than the first predetermined value and the second estimated vehicle speed is less than the second predetermined value.

6. A driving assistance apparatus comprising an electronic control unit configured to:
   recognize a first traffic light ahead of a vehicle;
   determine whether a first light color of the first traffic light is red or yellow;
   upon determination that the first light color is red or yellow, determine whether a driver of the vehicle has released the accelerator pedal of the vehicle;
   upon determination that the driver of the vehicle has released the accelerator pedal of the vehicle, estimate a first speed of the vehicle at a first stop line associated with the first traffic light if the vehicle decelerates by deceleration assistance control at a predetermined deceleration;
   determine whether the first speed is less than or equal to a first threshold value;
   upon determination that the first speed is not less than or equal to the first threshold value, determine whether a second light color of a second traffic light ahead of the vehicle beyond the first traffic light is red or yellow;
   upon determination that the second light color is red or yellow, estimate a second speed of the vehicle at a second stop line associated with the second traffic light if the vehicle decelerated by deceleration assistance control at the predetermined deceleration;

determine whether the second speed is less than or equal to a second threshold value;

upon determination that the second speed is less than or equal to the second threshold value, determine that deceleration assistance control is permitted; and upon determination that deceleration assistance control is permitted, control the vehicle to automatically decelerate toward the second traffic light.

* * * * *